United States Patent
Lee (10) Patent No.: US 10,434,758 B2
(45) Date of Patent: Oct. 8, 2019

(54) THREE-DIMENSIONAL PRINTING METHOD AND THREE-DIMENSIONAL PRINTING APPARATUS

(71) Applicants: XYZprinting, Inc., New Taipei (TW); Kinpo Electronics, Inc., New Taipei (TW)

(72) Inventor: Wei-Sheng Lee, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 642 days.

(21) Appl. No.: 15/152,567

(22) Filed: May 12, 2016

(65) Prior Publication Data

US 2017/0259508 A1 Sep. 14, 2017

(30) Foreign Application Priority Data

Mar. 9, 2016 (CN) .......................... 2016 1 0131442

(51) Int. Cl.
| | |
|---|---|
| *B33Y 10/00* | (2015.01) |
| *B33Y 30/00* | (2015.01) |
| *B33Y 50/02* | (2015.01) |
| *B29C 64/112* | (2017.01) |
| *B29C 64/393* | (2017.01) |

(52) U.S. Cl.
CPC ............ *B33Y 10/00* (2014.12); *B29C 64/112* (2017.08); *B29C 64/393* (2017.08); *B33Y 30/00* (2014.12); *B33Y 50/02* (2014.12)

(58) Field of Classification Search
CPC ...................................................... B29C 64/393
USPC .......................................................... 264/308
See application file for complete search history.

(56) References Cited

U.S. PATENT DOCUMENTS

| | | | | |
|---|---|---|---|---|
| 8,349,239 B2 * | 1/2013 | Hopkins | ............ | G05B 19/4099 264/308 |
| 9,688,025 B2 * | 6/2017 | Stava | ................... | B29C 67/0088 |
| 2017/0361630 A1 * | 12/2017 | Harigae | ..................... | B41J 2/32 |

* cited by examiner

*Primary Examiner* — Matthew J Daniels
*Assistant Examiner* — Hana C Page
(74) *Attorney, Agent, or Firm* — JCIPRNET (57) ABSTRACT

A three-dimensional printing apparatus and a three-dimensional printing method are provided. The method includes following step. An extending path associated with a first feeding path is obtained according to a feeding endpoint and at least one feeding point of the first feeding path. A printing head is controlled to move along the first feeding path according to a printing speed and to feed a forming material. The printing head is controlled to move along the extending path to an extending point according to a first speed, and to stop feeding the forming material, wherein the first speed is less than the printing speed. The printing head is controlled to move along a direction away from the extending point according to a second speed, wherein the second speed is greater than the printing speed.

9 Claims, 6 Drawing Sheets

THREE-DIMENSIONAL PRINTING METHOD AND THREE-DIMENSIONAL PRINTING APPARATUS

CROSS-REFERENCE TO RELATED APPLICATION

This application claims the priority benefit of China patent application serial no. 201610131442.9, filed on Mar. 9, 2016. The entirety of the above-mentioned patent application is hereby incorporated by reference herein and made a part of the specification.

BACKGROUND

Technical Field

The technical field relates to a printing apparatus, and particularly relates to a three-dimensional printing apparatus and a three-dimensional printing method.

Description of Related Art

In recent years, along with rapid development of technology, different methods for constructing three-dimensional (3D) models by using additive manufacturing technology such as layer-by-layer model constructing, etc. have been developed. Generally, the additive manufacturing technology is to convert design data of a 3D model constructed by software of computer aided design (CAD), etc. into a plurality of continuously stacked thin (quasi two-dimensional (2D)) cross-section layers. In this way, a printing module of a printing apparatus generally moves above a printing platform along an XY plane according to spatial coordinates XYZ constructed by the design data of the 3D model, such that a constructing material may form a correct shape of the cross-section layer. Then, by moving the printing module layer-by-layer along a Z-axis, a plurality of the cross-section layers are gradually stacked along the Z-axis, such that the constructing material forms a 3D object under a layer-by-layer curing condition.

Presently, in the 3D printing apparatus that produces the 3D object according to the aforementioned rapid prototyping method, a printing head is generally utilized to heat and melt a forming material, and coat the same on the printing platform layer-by-layer to construct the 3D object. When the 3D printing apparatus prints a delicate structure or a delicate pattern of a surface layer of the 3D object, the 3D printing apparatus is required to adjust a moving speed of the printing head to avoid a situation that the quickly moved printing head drags the uncured forming material or the forming material that is not fully adhered to cause deformation. That is, if the moving speed of the printing head is not properly adjusted, the 3D object produced by the 3D printing apparatus may have a gap compared with an actual expectation, which decreases printing quality and a printing yield of the 3D printing apparatus. However, to decrease the moving speed of the printing head may largely prolong an overall completion time of the 3D object.

SUMMARY

The disclosure is directed to a three-dimensional (3D) printing apparatus and a 3D printing method, which guarantees printing quality for printing delicate lines or a delicate structure and meanwhile shortens a time required by the 3D printing.

A 3D printing method is provided, which is adapted to control a printing head to feed a forming material according to printing information. The 3D printing method includes following steps. A plurality of feeding points is obtained according to the printing information. The feeding points include a feeding endpoint of a first feeding path. Then, an extending path associated with the first feeding path is obtained according to the feeding endpoint and at least one feeding point of the first feeding path. The feeding endpoint of the first feeding path is an extending start point of the extending path, and an extending endpoint of the extending path is an extending point. Then, the printing head is controlled to move along the first feeding path according to a printing speed and to feed the forming material. The printing head is controlled to move to the extending point along the extending path according to a first speed, and to stop feeding the forming material, wherein the first speed is smaller than the printing speed. The printing head is controlled to move along a direction away from the extending point according to a second speed, where the second speed is greater than the printing speed.

According to another aspect, A 3D printing apparatus including a platform, a printing head, a controller and a processor is provided. The platform includes a carrying surface, and the printing head is disposed above the platform. The printing head is configured to move along a moving plane and move along a normal direction of the moving plane. The controller is coupled to the platform and the printing head, and controls the printing head to feed a forming material according to printing information. The processor obtains a plurality of feeding points according to the printing information. The feeding points include a feeding endpoint of a first feeding path. The processor obtains an extending path associated with the first feeding path according to the feeding endpoint and at least one feeding point of the first feeding path, where the feeding endpoint of the first feeding path is an extending start point of the extending path, and an extending endpoint of the extending path is an extending point. The controller controls the printing head to move along the first feeding path according to a printing speed and to feed the forming material. The controller controls the printing head to move to the extending point along the extending path according to a first speed, and to stop feeding the forming material, wherein the first speed is smaller than the printing speed. The controller controls the printing head to move along a direction away from the extending point according to a second speed, where the second speed is greater than the printing speed.

According to the above description, in the embodiments of the disclosure, during a period when the printing head is moved from the feeding endpoint of the first feeding path to another position, the printing head stops feeding and is first moved to the extending point along an extending direction according to the slower first speed, and is then moved to another position according to a faster second speed. The extending direction of the extending path may can be determined according to the feeding endpoint of the first feeding path and the at least one feeding point. By additionally adding the extending path, a situation that the printing head pulls the forming material that is still not completely cured due to fast turning of the printing head is avoided.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Figure 1:
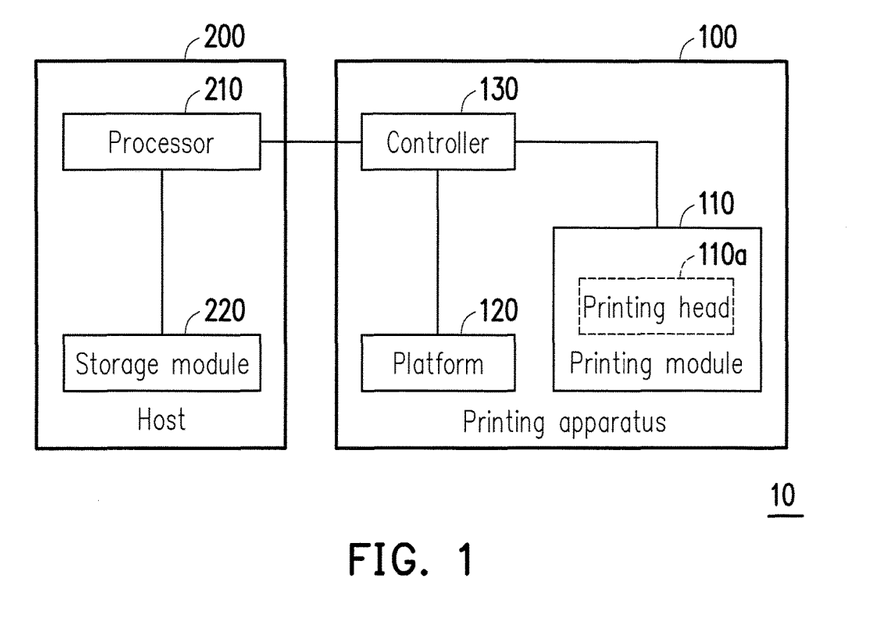
FIG. 1 is a block schematic diagram of a 3D printing apparatus according to one of the embodiments.

FIG. 1 is a block schematic diagram of a 3D printing apparatus according to one of the embodiments. Referring to FIG. 1, the 3D printing apparatus 10 of the present embodiment includes a printing device 100 and a host 200. The 3D printing apparatus 10 is adapted to print a 3D object according to printing control information. Further, the host 200 is a device having a computation function, for example, a computer device such as a notebook computer, a tablet computer or a desktop computer, etc., and the type of the host 200 is not limited by the disclosure. The host 200 may edit and process a 3D model and transmit the related printing control information to the printing device 100, and the printing device 100 may print a 3D object according to the printing control information.

In the present embodiment, the printing control information can be a 3D digital image file, which is, for example, constructed by the host 200 through computer-aided design (CAD) or animation modelling software, etc. Moreover, the host 200 executes a slicing processing on the 3D model to obtain layer information associated with a plurality of layer objects, such that the printing device 100 may sequentially print each of the layer objects according to the layer information corresponding to the layer objects, and finally produce an integral 3D object. However, the disclosure is not limited to the implementation pattern that the host and the printing device belong to different hardware devices. In another embodiment, the 3D printing apparatus can be implemented by a printing device including a processor.

Referring to FIG. 1, the printing device 100 is coupled to the host 200, and the host 200 includes a processor 210 and a storage module 220. The processor 210 is, for example, a central processing unit (CPU), or other programmable general purpose or special purpose microprocessor, a digital signal processor (DSP), a programmable controller, an application specific integrated circuit (ASIC), a programmable logic device (PLD) or other similar device or a combination of the devices, which is not limited by the disclosure.

The storage module 220 is, for example, any type of a fixed or movable random access memory (RAM), a read-only memory (ROM), a flash memory, a hard disk or other similar devices or a combination of the above devices. The storage module 220 stores a plurality of instructions, and the instructions and a program can be loaded into the processor 210 and executed by the same to edit and process the 3D model.

It should be noted that the 3D model is further compiled and calculated to produce the printing control information adapted to be read by the printing device 100 to execute the printing function. In detail, the processor 210 of the host 200 first perform is a slicing processing on the 3D model to generate layer information associated with a plurality of layer objects. Generally, the processor 210 slices the 3D model by using layer planes with fixed intervals, so as to facilitate extracting sectional profiles of the layer objects. The layer information includes a plurality of feeding points generated based on the sectional profiles of the layer objects.

The processor 210 further generates a corresponding control code file according to the feeding point of each layer object. The control code file is the printing control information adapted to read by the printing device 100 to implement the printing function. In other words, the controller 130 of the printing device 100 controls the components in the printing device 100 according to the control code file, so as to form the layer objects on the platform 120 layer-by-layer. In an embodiment, the control code file is, for example, a G code file.

Figure 2:
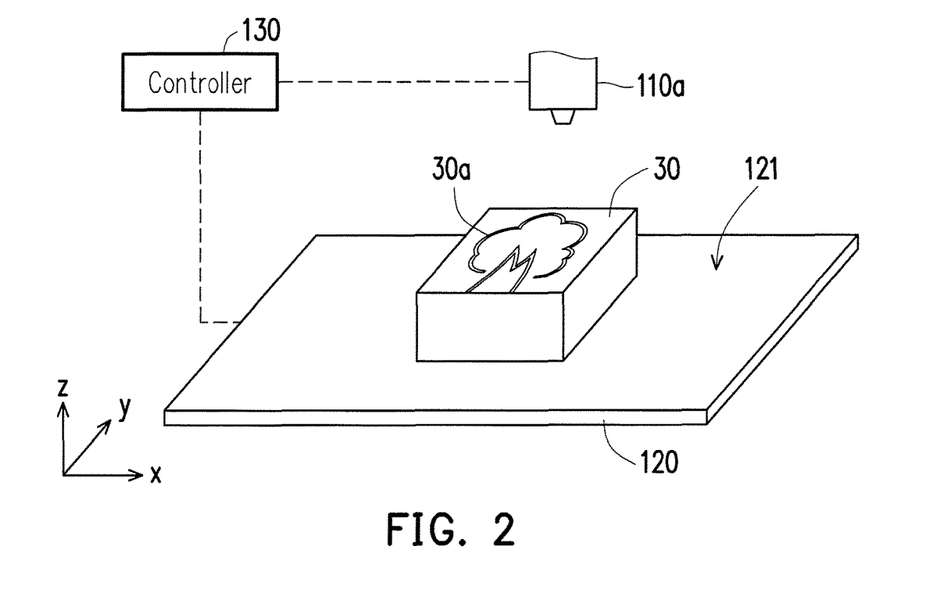
FIG. 2 is a schematic diagram of a 3D printing apparatus according to one of the embodiment.

The printing device 100 is adapted to print a 3D object according to the printing control information transmitted by the host 200. To be specific, the controller 130 controls various parts of the printing device 100 according to the printing control information to repeatedly print the forming material on specific positions until the whole 3D object is produced. FIG. 2 is a schematic diagram of a 3D printing apparatus according to one of the embodiments. Referring to FIG. 1 and FIG. 2, in the present embodiment, the printing device 100 includes a printing module 110, a platform 120 and a controller 130. A Cartesian coordinate system is provided to describe the related components and motion states thereof. The platform 120 includes a carrying surface 121. The printing module 110 is disposed above the platform 120 and includes a printing head 110a, where the printing head 110a is configured to move along an XY plane and move along a normal direction (a Z-axis direction) of the XY plane, so as to print the layer objects on the carrying surface layer-by-layer to gradually form a 3D object 30.

Further, in the present embodiment, the forming material can be a hot-melt wire rod suitable for fused filament fabrication, and the printing head 110a may heat the forming material to melt the forming material transmitted to the printing head 110a into a fluid material presenting a molten state, and the printing head 110a squeezes the forming material in the high-temperature and molten state. For example, the forming material of the 3D object 30 can be various suitable materials suitable for fabrication method such as fused filament fabrication (FFF) or melted and extrusion modeling, etc. In this way, the forming material in the molten state is cured on the carrying surface 121 layer-by-layer to form the 3D object 30.

Moreover, the controller 130 is coupled to the printing head 110a and the platform 120, and is configured to read the printing control information, and controls a whole operation of the printing device 100 to print the 3D object 30 according to the printing control information. For example, the controller 130 may control a moving path of the printing head 110a according to the printing control information, and controls a precision of a feeding head squeezing the forming material, or controls a moving speed of the printing head 110a. The controller 130 is, for example, a central processor, a chipset, a microprocessor, a micro controller, etc., that has a computation function, which is not limited by the disclosure.

In the present embodiment, the printing head 110a moves on the XY plane along at least one moving path based on the layer information of each of the layer objects. The moving path includes a feeding path, and during a period that the printing head 110a moves along the feeding path, the printing head 110a squeezes the forming material of the molten state in the same time, and the feeding path includes a feeding start point and a feeding endpoint. It should be noted that the processor 120 may determine an extending path based on the feeding points on the feeding path, such that when the printing head 110a is moved to the feeding endpoint of the feeding path, the printing head 110a is first moved to an extending point along the extending path and is then moved to another position, where the aforementioned another position can be a feeding start point of another feeding path, a predetermined origin or located on the top of a maintain station. In this way, for example, when the printing device 100 prints a pattern 30a on the top layer of the 3D object 30, a situation that the forming material on the feeding point is pulled by the printing head 100a to cause deformation of the pattern 30a due to drastic change of the moving direction of the printing head 100a is avoided.

Moreover, the controller 130 controls the printing head 110a to move along the feeding path according to the printing speed, and controls the printing head 110a to first move to an extending point along the extending path according to a first speed, and then move towards a direction away from the extending point according to a second speed. In this way, an overall printing speed of the 3D printing apparatus is accelerated under a condition of ensuring the printing quality.

Figure 3:
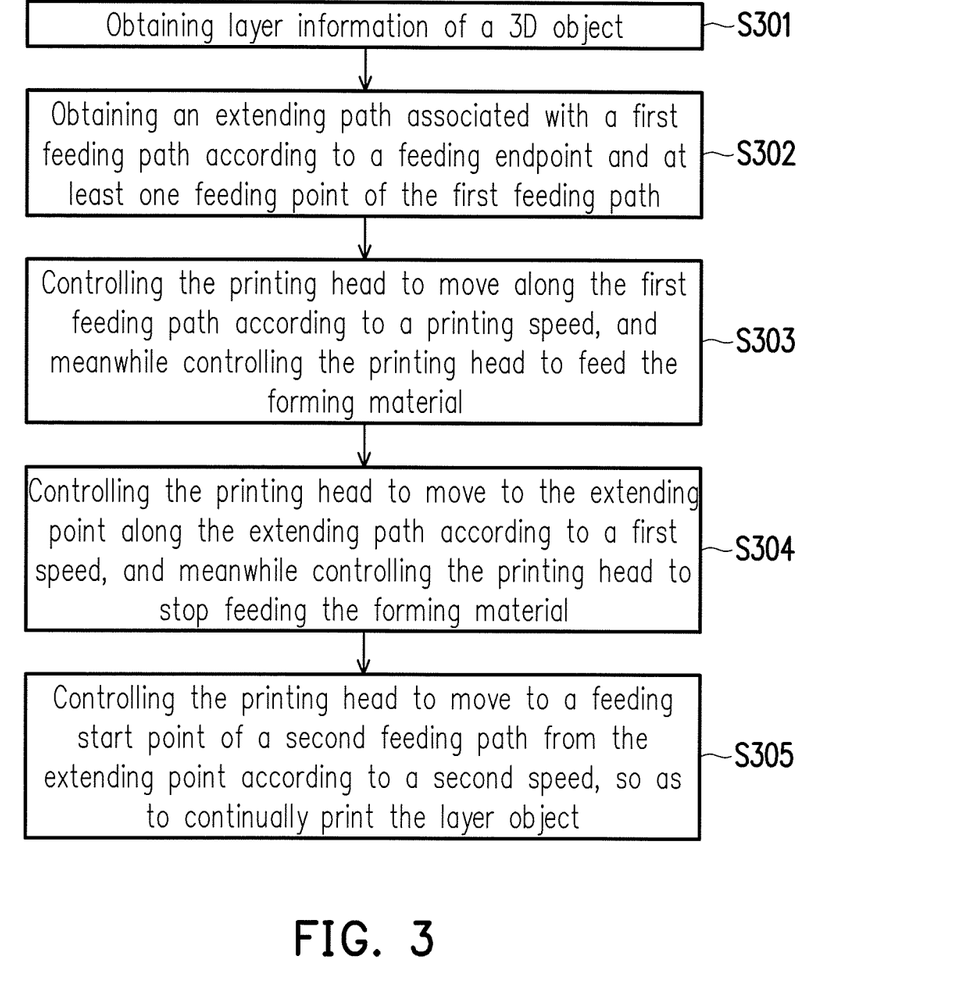
FIG. 3 is a flowchart illustrating a 3D printing method according to one of the embodiment.

FIG. 3 is a flowchart illustrating a 3D printing method according to one of embodiments. The 3D printing method of the present embodiment is adapted to the 3D printing apparatus 10 of FIG. 1, and detailed steps of the 3D printing method of the present embodiment are introduced below with reference of various components of the 3D printing apparatus 10. It should be noted that a situation that the printing head is first moved to the extending point and then moved to a feeding start pint of another feeding path is taken as an example for description, though the disclosure is not limited thereto.

Figure 4:
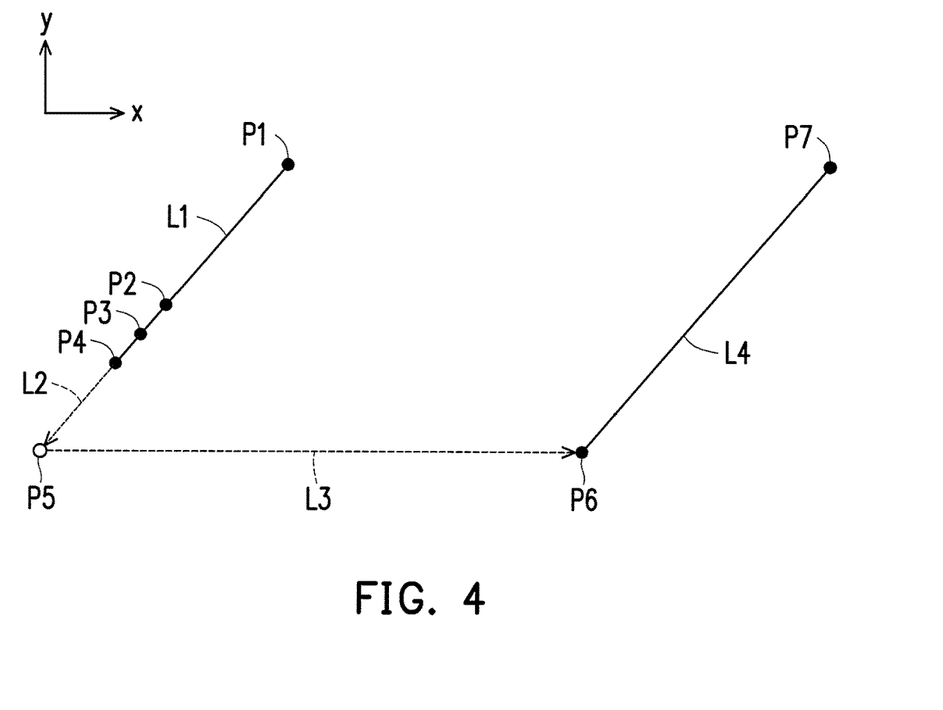
FIG. 4 is a schematic diagram of a moving path of a printing head according to one of the embodiments.

In step S301, the processor 210 obtains layer information of a 3D object. The 3D object includes a layer object, and the layer information includes a plurality of feeding points of the layer object. The feeding points include a feeding endpoint of a first feeding path and a feeding start point of a second feeding path. FIG. 4 is a schematic diagram of a moving path of a printing head according to one of the embodiments. Referring to FIG. 4, the layer information, for example, includes a plurality of feeding points of a first feeding path L1 and a plurality of feeding points of a second feeding path L4. The feeding points of the first feeding path L1 include a feeding start point P1, a feeding endpoint P4 and other feeding points P2 and P3. Similarly, the feeding points of the second feeding path L4 include a feeding start point P6 and a feeding endpoint P7. The aforementioned feeding points all have corresponding coordinates.

In step S302, the processor 210 obtains an extending path associated with the first feeding path according to the feeding endpoint and at least one feeding point of the first feeding path. The feeding endpoint of the first feeding path is an extending start point of the extending path, and an extending endpoint of the extending path is an extending point. A printing sequence of the first feeding path is earlier than the second feeding path. Referring to FIG. 4, the processor 210 may obtain an extending path L2 associated with the first feeding path L1 according to the feeding endpoint P4 of the first feeding path L1 and at least one of the feeding points P2-P3 of the first feeding path L1. As shown in FIG. 4, the extending path L2 is substantially an extension of the first feeding path L1, and the feeding endpoint P4 of the first feeding path L1 is an extending start point of the extending path L2, and an extending endpoint of the extending path L2 is an extending point P5. However, FIG. 4 is only an exemplary embodiment used for describing the disclosure, and the disclosure is not limited thereto.

After the processor 210 completes processing the layer information of each of the layer objects to obtain the feeding points and the extending path of each of the layer objects, the processor 210 generates the corresponding printing control information, and the controller 130 controls the printing head 110a to move according to the feeding points and the extending path. In step S303, the controller 130 controls the printing head 110a to move along the first feeding path according to a printing speed, and meanwhile controls the printing head 110a to feed the forming material. In step S304, the controller 130 controls the printing head 110a to move to the extending point along the extending path according to a first speed, and meanwhile controls the printing head 110a to stop feeding the forming material, wherein the first speed is smaller than the printing speed. In step s305, the controller 130 controls the printing head 110a to move to the feeding start point of the second feeding path from the extending point according to a second speed, so as to continually print the layer object along the second feeding path, where the second speed is greater than the printing speed.

Referring to FIG. 4, the controller 130 may control the printing head 110a to first move to the feeding endpoint P4 from the feeding start point P1 along the first feeding path L1, and meanwhile the controller 130 controls the printing head 110a to move according to the printing speed, and to feed the forming material. Then, the controller 130 controls the printing head 110a to move to the extending point P5 along the extending path L2 according to the first speed, and meanwhile controls the printing head 110a to stop feeding the forming material. It should be noted that the first speed is smaller than the printing speed. For example, when the printing speed is 10 (inches/second), the first speed can be 5 (inches/second).

Then, the controller 130 controls the printing head 110a to move to the feeding start point P6 of the second feeding path L4 along a path L3 according to the second speed, and meanwhile controls the printing head 110a to stop feeding the forming material. It should be noted that the second speed is greater than the printing speed. For example, when the printing speed is 10 (inches/second), the second speed can be 10 (inches/second). Namely, the controller 130 controls the printing head 110a to move to the feeding start point P6 of the second feeding path L4 from the extending point P5 according to the second speed, so as to continually print the layer object along the second feeding path L4.

In an embodiment, the processor 210 may determine an extending direction of the extending path according to the feeding endpoint of the first feeding path and at least one feeding point on the first feeding path. Taking FIG. 4 as an example, the processor 210 may compare coordinates of the feeding endpoint P4 with coordinates of the at least one feeding point P3 to select the extending direction of the extending path L2 from a plurality of predetermined directions. Alternatively, taking FIG. 4 as an example, the processor 210 may calculate a slope according to the coordinates of the feeding endpoint P4 and the coordinates of the at least one feeding point P3, and determine the extending direction of the extending path L2 according to the above slope.

Figure 5:
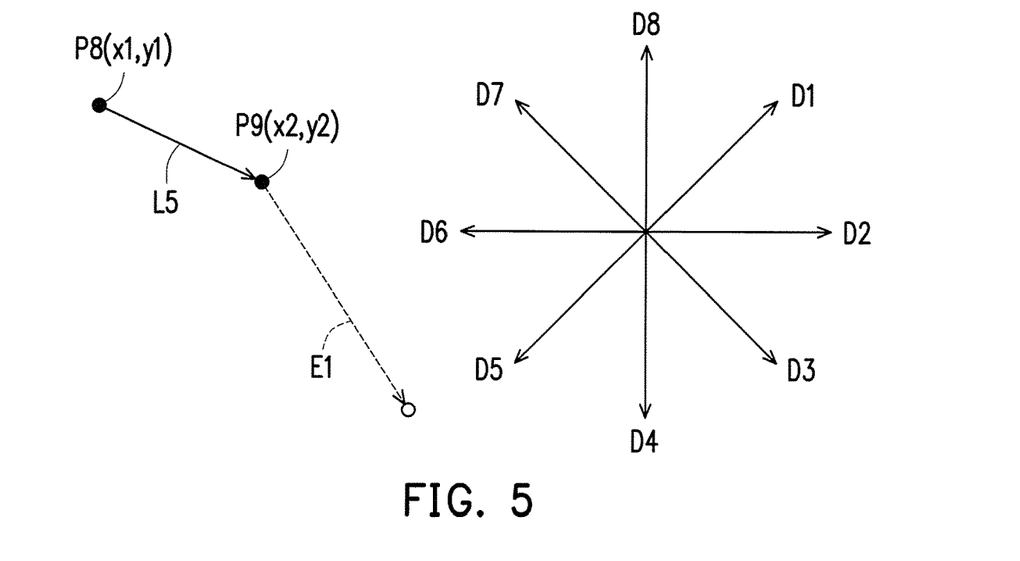
FIG. 5 is a schematic diagram of predetermined directions according to one of the embodiments.

FIG. 5 is a schematic diagram of determining the extending direction according to one of the embodiments. Referring to FIG. 5, a feeding path L5 includes a feeding point P8 and a feeding endpoint P9. The processor 210 compares a first coordinate component x2 of the feeding endpoint P9 with a first coordinate component x1 of the feeding point P8, and compares a second coordinate component y2 of the feeding endpoint P9 with a second coordinate component y1 of the feeding point P8, so as to select one of a plurality of predetermined directions D1-D8 to serve as the extending direction. In the present embodiment, the processor 210 selects the predetermined direction D3 to serve as the extending direction of the extending path E1.

Figure 6:
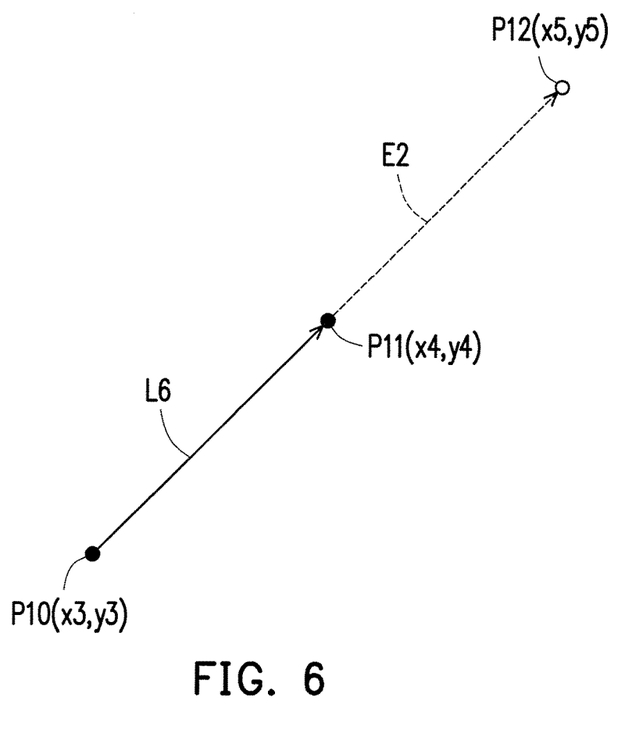
FIG. 6 is a schematic diagram of determining an extending direction according to a slope according to one of the embodiments.

FIG. 6 is a schematic diagram of determining the extending direction according to a slope according to one of embodiments. Referring to FIG. 6, a feeding path L6 includes a feeding point P10 and a feeding endpoint P11. The processor 210 calculates an extending slope by using a first coordinate component x4 and a second coordinate component y4 of the feeding endpoint P11 and by using a first coordinate component x3 and a second coordinate component y3 of the feeding point P10 (the extending slope=(y3−y4)/(x3−x4)). Then, the processor 210 determines the extending direction of an extending path E2 according to the extending slope, or determines a first coordinate component x5 and a second coordinate component y5 of the extending point P12 according to the extending slope.

Figure 7:
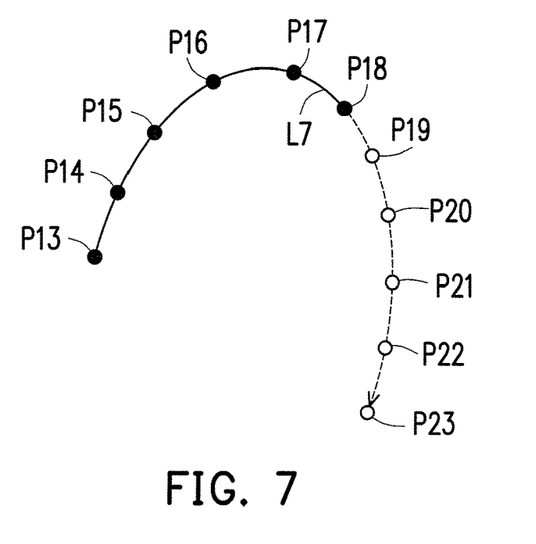
FIG. 7 is a schematic diagram of determining an approximate curve equation according to feeding points according to one of the embodiments.

In an embodiment, the processor 210 may estimate an approximate curve equation according to the first coordinate component and the second coordinate component of the feeding endpoint on the first feeding path and the first coordinate component and the second coordinate component of the feeding point on the first feeding path, so as to determine a plurality of extending-positioning points on the extending path according to the approximate curve equation. For example, FIG. 7 is a schematic diagram of determining the approximate curve equation according to the feeding points according to one of the embodiments. Referring to FIG. 7, a feeding path L7 includes feeding points P13-P17 and a feeding endpoint P18. The processor 210 may estimate an approximate curve equation by using a plurality of feeding points P13-P17 and the feeding endpoint P18 at the end of the first feeding path L7, so as to determine a plurality of extending-positioning points P19-P23 on an extending path E3 according to the approximate curve equation. In the present embodiment, the approximate curve equation is a parabolic equation, though the disclosure is not limited thereto.

It should be noted that in an embodiment of the disclosure, the processor 210 may further determine an extending distance of the extending path according to a feeding head precision of the printing head, where the higher the feeding head precision is, the shorter the extending distance is. In an embodiment, the extending distance of the extending path can be directly proportional to the feeding head precision. For example, if the feeding head precision is set to 0.1 cm, the extending distance is then 0.5 cm, and if the feeding head precision is set to 0.2 cm, the extending distance is then 1 cm. Alternatively, in an embodiment, the processor 210 may also adopt a table look-up method to look up the corresponding extending distance according to the feeding head precision.

Moreover, in an embodiment of the disclosure, the processor 210 may further determines the first speed and the second speed according to the printing speed, where the first speed is smaller than the printing speed, and the printing speed is smaller than the second speed. The printing speed is a moving speed of the printing head 110a when the printing head 110a feeds the forming material, and the first speed is a moving speed of the printing head 110a when the printing head 110a moves along the extending path, and the second speed is a moving speed of the printing head 110a when the printing head 110a is moved to a next feeding start point from the extending point.

Figure 8:
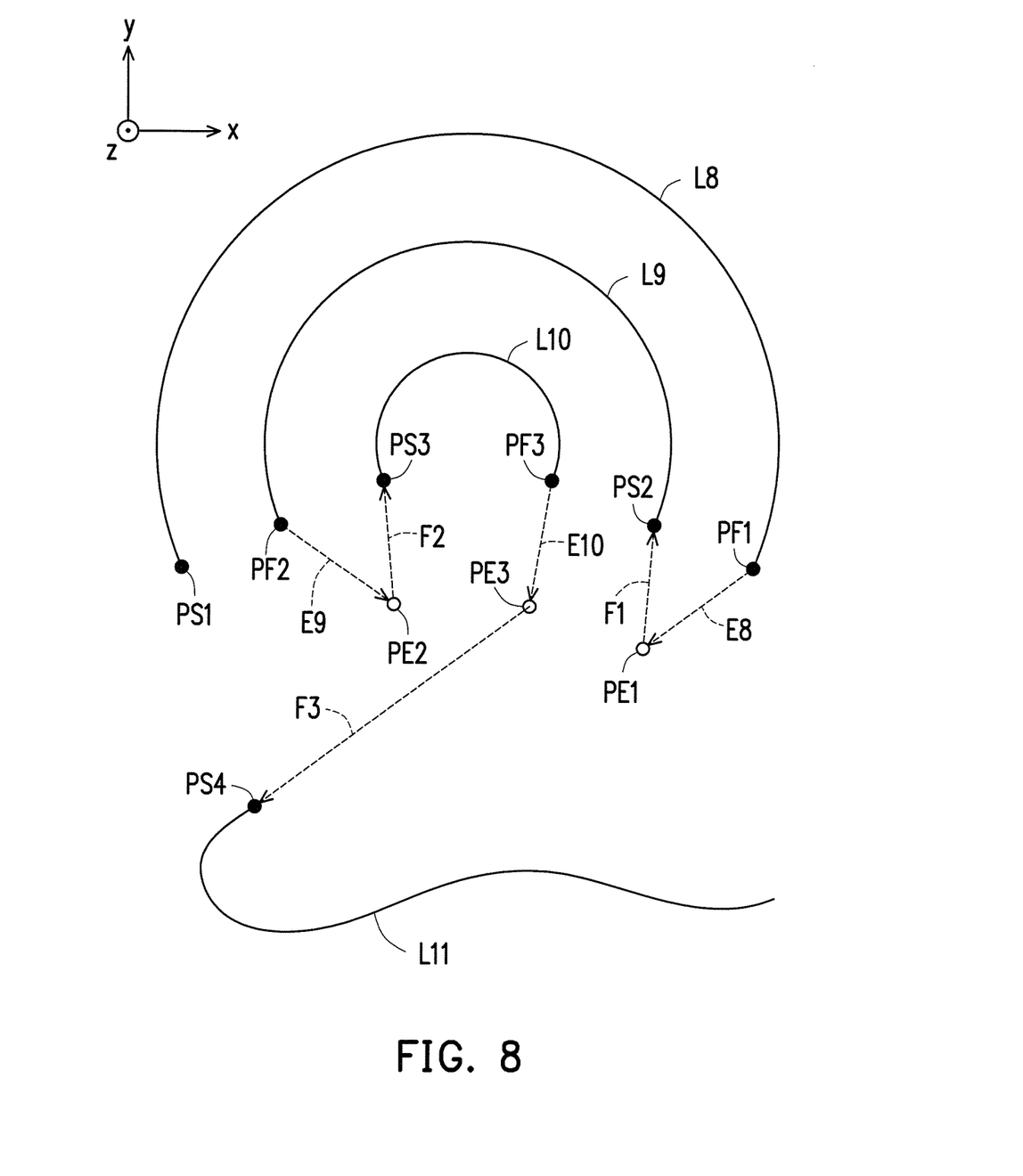
FIG. 8 is a schematic diagram of a moving path of a printing head according to one of the embodiments.

FIG. 8 is a schematic diagram of a moving path of the printing head according to one of the embodiments. Referring to FIG. 8, the 3D printing apparatus may determine extending paths E8-E10 and extending points PE1-PE3 according to the layer information of the 3D object. Determination method of the extending paths E8-E10 and the extending points PE1-PE3 has been described in the aforementioned description, and detail thereof is not repeated. After the 3D printing apparatus obtains the extending paths E8-E10 and the extending points PE1-PE3, the printing head of the 3D printing apparatus is moved to a feeding endpoint PF1 from a feeding start point PS1 along the feeding path L8 according to the printing speed, and meanwhile the printing head feeds the forming material. Then, the printing head stops feeding the forming material, and the printing head is first moved to the extending point PE1 from the feeding endpoint PF1 along the extending path E8 according to the slower first speed, and is then moved to a feeding start point PS2 from the extending point PE1 along a path F1 according to the faster second speed.

Then, the printing head of the 3D printing apparatus is moved to a feeding endpoint PF2 from the feeding start point PS2 along the feeding path L9 according to the printing speed, and meanwhile the printing head feeds the forming material. Then, the printing head stops feeding the forming material, and the printing head is first moved to the extending point PE2 from the feeding endpoint PF2 along the extending path E9 according to the slower first speed, and is then moved to a feeding start point PS3 from the extending point PE2 along a path F2 according to the faster second speed. Then, the printing head is further moved to a feeding endpoint PF3 from the feeding start point PS3 along the feeding path L10 according to the printing speed, and meanwhile the printing head feeds the forming material. Then, the printing head stops feeding the forming material, and the printing head is first moved to the extending point PE3 from the feeding endpoint PF3 along the extending path E10 according to the slower first speed, and is then moved to a feeding start point PS4 from the extending point PE3 along a path F3 according to the faster second speed.

Figure 9:
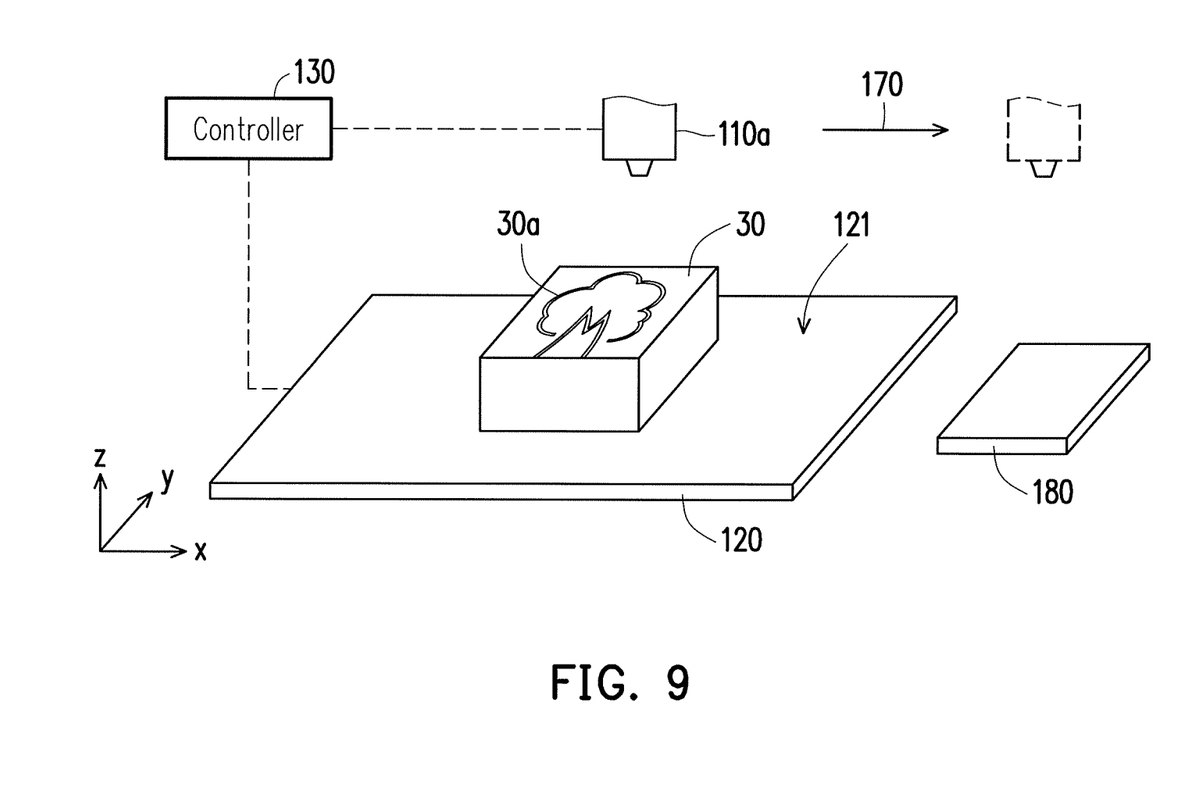
FIG. 9 is a schematic diagram of a 3D printing apparatus according to one of the embodiments.

It should be noted that in the aforementioned embodiment, although the situation that the printing head is moved to the feeding start point of a next feeding path from the extending point according to the second speed is taken as an example for description, the disclosure is not limited thereto. In another embodiment, the controller may also control the printing head to move to a predetermined origin or a maintain station from the extending point according to the second speed. The aforementioned predetermined origin can be an origin on the XY plane, or a predetermined position where the printing head is located in case of standby. Moreover, FIG. 9 is a schematic diagram of a 3D printing apparatus according to one of the embodiments. Referring to FIG. 9, the embodiment of FIG. 9 is similar to the embodiment of FIG. 2, though the 3D printing apparatus 100 of the present embodiment further includes a maintain station 180, where the maintain station 180 is disposed at a side of the platform 120. To be specific, when the printing head 110a is moved to the top of the maintain station 180 along a direction 170 away from the extending point, the controller 130 may execute a cleaning procedure of the printing head 100a. The cleaning procedure is, for example, a procedure of cleaning internal components (such as a molten nozzle or a feeding roller) of the printing head 110a.

In summary, in the embodiments of the disclosure, during a period that the printing head is moved from the feeding endpoint of the first feeding path to the feeding start point of the second feeding path, the printing head stops feeding, and is first moved to the extending point along an extending direction according to the slower first speed, and is then moved to the feeding start point of the second feeding path according to the faster second speed. The extending direction of the extending path can be determined according to the feeding endpoint and at least one feeding point of the first feeding path, and the extending distance of the extending path can be determined according to a feeding head precision of the printing head. In this way, the printed 3D object is avoided to have a gap compared with an actual expectation, and the printing speed of the 3D printing apparatus is improved. Moreover, the length of the extending path can be determined according to the feeding head precision, and the length of the extending path can be flexibly configured according to an actual requirement, so as to optimize a manufacturing time of the 3D object.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A three-dimensional printing method, adapted to control a printing head to feed a forming material according to printing information, the three-dimensional printing method comprising:

obtaining a plurality of feeding points according to the printing information, wherein the feeding points comprise a feeding endpoint of a first feeding path;

obtaining an extending path associated with the first feeding path according to the feeding endpoint and at least one feeding point of the first feeding path, wherein the feeding endpoint of the first feeding path is an extending start point of the extending path, and an extending endpoint of the extending path is an extending point;

controlling the printing head to move along the first feeding path according to a printing speed and meanwhile to feed the forming material;

controlling the printing head to move to the extending point along the extending path according to a first speed, and meanwhile to stop feeding the forming material, wherein the first speed is smaller than the printing speed; and controlling the printing head to move along a direction away from the extending point according to a second speed, wherein the second speed is greater than the printing speed.

2. The three-dimensional printing method as claimed in claim 1, wherein the step of obtaining the extending path associated with the first feeding path according to the feeding endpoint and the at least one feeding point of the first feeding path comprises:

determining an extending direction of the extending path according to the feeding endpoint and the at least one feeding point.

3. The three-dimensional printing method as claimed in claim 2, wherein the step of determining the extending direction of the extending path according to the feeding endpoint and the at least one feeding point comprises:

comparing a first coordinate component of the feeding endpoint with a first coordinate component of the at least one feeding point, and comparing a second coordinate component of the feeding endpoint with a second coordinate component of the at least one feeding point to select one of a plurality of predetermined directions to serve as the extending direction.

4. The three-dimensional printing method as claimed in claim 2, wherein the step of determining the extending direction of the extending path according to the feeding endpoint and the at least one feeding point comprises:

calculating an extending slope by using a first coordinate component and a second coordinate component of the feeding endpoint and by using a first coordinate component and a second coordinate component of the at least one feeding point; and determining the extending direction according to the extending slope.

5. The three-dimensional printing method as claimed in claim 1, wherein the step of obtaining the extending path associated with the first feeding path according to the feeding endpoint and the at least one feeding point of the first feeding path comprises:

estimating an approximate curve equation according to a first coordinate component and a second coordinate component of the feeding endpoint and a first coordinate component and a second coordinate component of the feeding points, so as to determine a plurality of extending-positioning points on the extending path according to the approximate curve equation.

6. The three-dimensional printing method as claimed in claim 1, further comprising:

determining an extending distance of the extending path according to a feeding head precision of the printing head, wherein the higher the feeding head precision is, the shorter the extending distance is.

7. The three-dimensional printing method as claimed in claim 1, further comprising:

determining the first speed and the second speed according to the printing speed.

8. The three-dimensional printing method as claimed in claim 1, wherein the printing information comprises a feeding start point of a second feeding path, and the step of controlling the printing head to move along the direction away from the extending point according to the second speed comprises:
    moving the printing head to the feeding start point of the second feeding path according to the second speed, and controlling the printing head to start feeding the feeding material while moving the printing head to the feeding start point.

9. The three-dimensional printing method as claimed in claim 1, wherein the step of controlling the printing head to move along the direction away from the extending point according to the second speed comprises:
    controlling the printing head to move to a predetermined origin or a maintain station according to the second speed; and
    executing a cleaning procedure of the printing head when the printing head is moved to the maintain station.

\* \* \* \* \*